May 17, 1932. L. DINESEN 1,858,266
MILKING APPARATUS
Filed Jan. 13, 1930 2 Sheets-Sheet 2
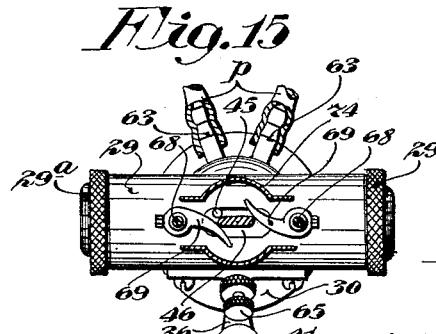
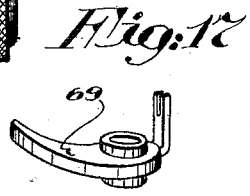
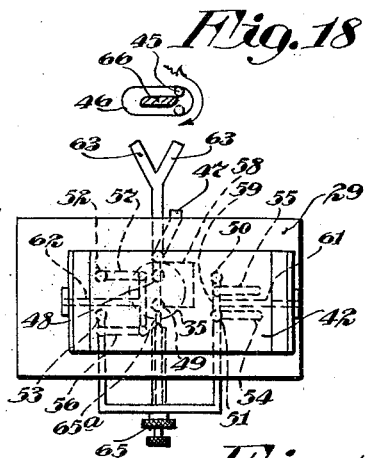
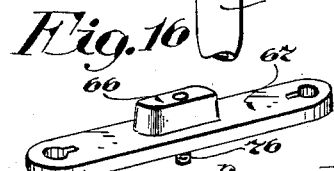
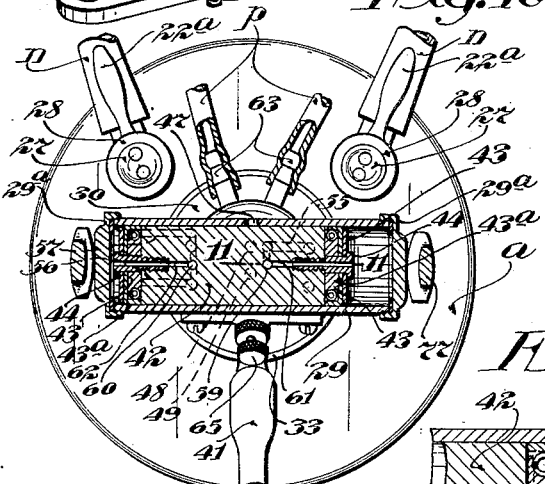
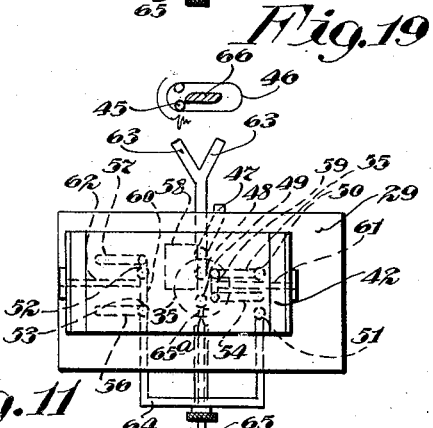
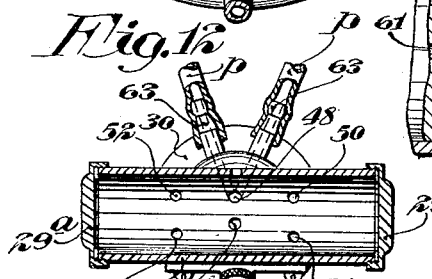
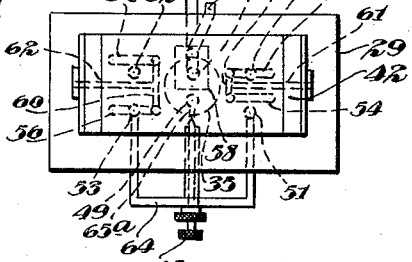
Inventor
Laurits Dinesen
By his Attorneys Patented May 17, 1932

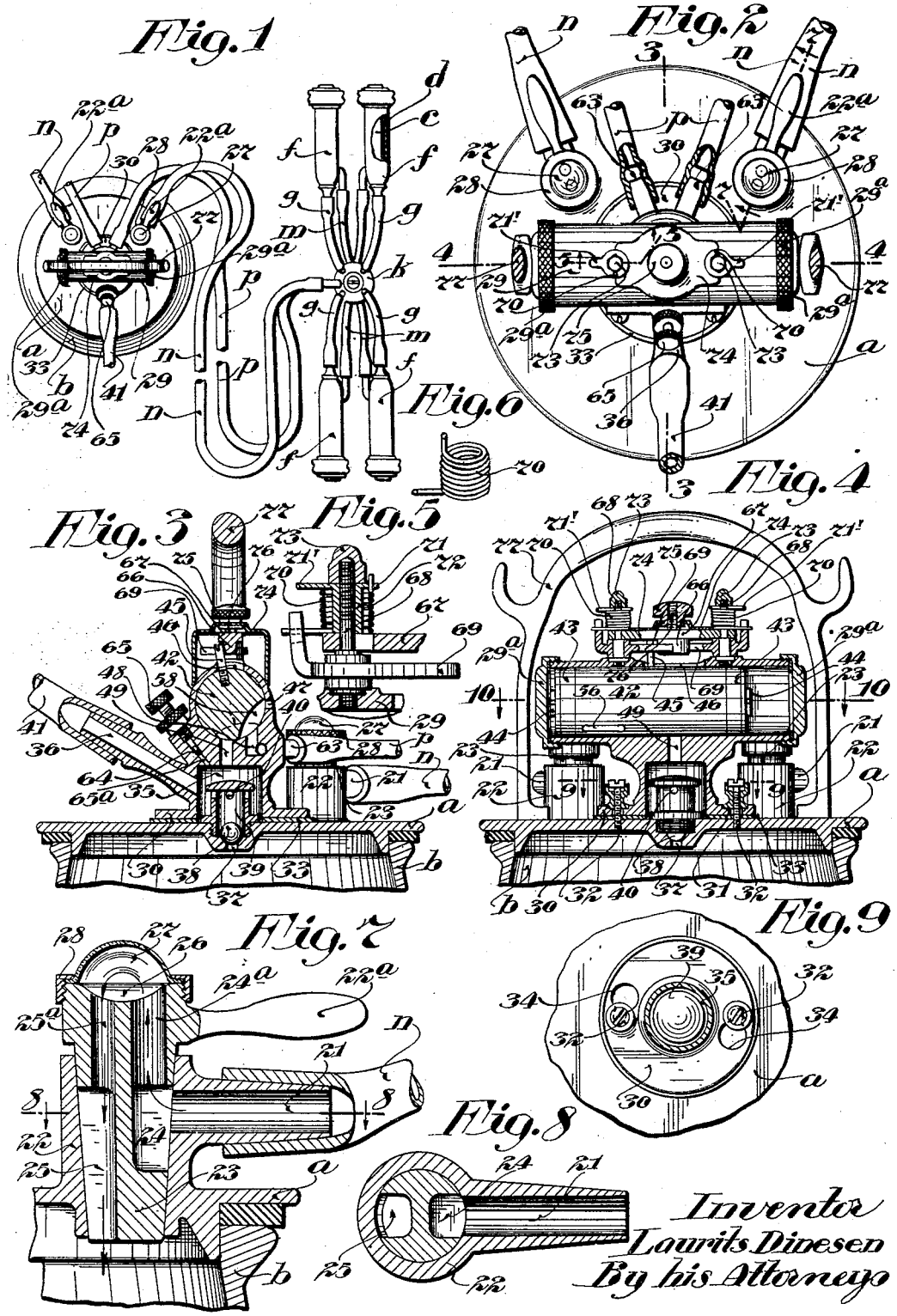

1,858,266

UNITED STATES PATENT OFFICE

LAURITS DINESEN, OF MINNEAPOLIS, MINNESOTA

MILKING APPARATUS

Application filed January 13, 1930. Serial No. 420,454.

My present invention relates to milking apparatus of the type wherein the milking operation is produced in the teat cups by pneumatic pressure pulsations; and the present invention is directed particularly to the improvement of the pulsator mechanism whereby the pressure pulsations are produced. The invention also involves other important features as will hereinafter appear. The present improved pulsator is an improvement on or modification of the pulsator disclosed and broadly claimed in my prior Patents No. 1,117,169 of November 17, 1914, and 1,371,355 of March 15, 1921.

In the accompanying drawings, which illustrate a commercial form of the invention, like characters indicate like parts throughout the several views.

Referring to the drawings:

Fig. 1 is a plan view showing the pulsator applied to the cover of a milk can or receptacle and connected to one group of teat cups, the second group of teat cups being removed;

Fig. 2 is a plan view showing the cover of the milk can with the pulsator and milk connections applied thereto, some parts being sectioned and some parts being broken away;

Fig. 3 is a transverse section taken on the line 3—3 of Fig. 2;

Fig. 4 is a section taken on the line 4—4 of Fig. 2, some parts being sectioned;

Fig. 5 is an enlarged fragmentary section taken on the line 5—5 of Fig. 2;

Fig. 6 is a perspective showing one of the tension springs of the device illustrated in Fig. 5;

Fig. 7 is a section taken on the line 7—7 of Fig. 2;

Fig. 8 is a section taken on the line 8—8 of Fig. 7;

Fig. 9 is a section taken on the line 9—9 of Fig. 4;

Fig. 10 is a horizontal section taken on the line 10—10 of Fig. 4;

Fig. 11 is a fragmentary section taken on the line 11—11 of Fig. 10;

Fig. 12 is a fragmentary horizontal section taken on the same line as Fig. 10, but with the piston of the pulsator and certain other parts removed;

Fig. 13 is a plan view showing the piston of the pulsator removed from the cylinder thereof;

Fig. 14 is a section on the line 14—14 of Fig. 13;

Fig. 15 is a horizontal section taken approximately on the line 15—15 of Fig. 3;

Fig. 16 is a perspective showing the cam bar of the pulsator removed from working position and turned upside down;

Fig. 17 is a perspective showing one of the yielding cam acting shipper arms of the pulsator; and Figs. 18, 19 and 20 are diagrammatic views illustrating the relation between ports in the cylinder and in the co-operating piston.

The pulsator mechanism comprises a cylinder and a piston, the latter of which is preferably supported on the cover $a$ of a milk pail or receptacle $b$ in which latter partial vacuum is maintained. The milking apparatus is especially designed for use in connection with double-chamber teat cups such as comprise rubber or collapsible inner tubes $c$ that form inner teat cup chambers surrounded by air chambers $d$ within metallic shells $f$, see particularly Fig. 1. Furthermore, the apparatus illustrated involves two groups of four teat cups in which the inner chambers $c$ are connected by flexible branch tubes $g$ to a coupling head $h$. The outer or air chambers $d$ of the teat cups are connected by flexible branch tubes $m$ to the corresponding coupling heads $k$. Coupling head $k$ does not form a connection between the tubes $g$ and $m$ but connects the four branch milk tubes $g$ to a main milk tube $n$ and connects the four branch air tubes $m$ to a main air tube $p$.

As will hereinafter appear, the apparatus, as illustrated is designed for the simultaneous or independent milking of two cows and hence for each group of teat cups there is a milk tube $n$ and an air tube $p$.

The milk tubes $n$ are connected to nipples 21 that project from tapered sleeve-like valve casings 22 formed on and projecting upward from the pail cover $a$. Seated in the valve seats 22 are tapered rotary valves 23 formed with diametrically opposite ports 24 and 25, the latter of which at its lower end opens into the milk pail. Ports 24 and 25 have upper end extensions 24ª and 25ª that are connected at their upper ends through a chamber 26 that is covered and enclosed by a cap 27, see particularly Fig. 7. Cap 27 is preferably made of glass or transparent material and is detachably clamped to the upper end of the valve by a threaded clamping ring 28. The transparent cap 27 is important because, as will later appear, it permits the operator to observe at all times the flow of milk from the teat cups into the milk pail or receptacle. Valve 23 is provided with a suitable operating handle 22ª.

The pulsator mechanism comprises a cylinder 29, the block or base of which is expanded to form a disc-like clamping flange 30 seated on the top of the cover $a$ and clamped thereto by nuts 31 on studs 32 rigidly secured to and projecting upward from said cover. A pliable washer-like gasket 33 is interposed between the base flange 30 and the top of the cover and forms an air-tight joint. To make the pulsator mechanism readily detachable from the cover, its flange 30 is formed with bayonet slots 34 through which the nuts 32 will pass when and only when the pulsator is turned in a counter-clockwise direction in respect to Fig. 9 so as to align said nuts with the enlarged portions of said slots.

In the base of the cylinder is formed quite a large chamber 35 that is in communication with an outwardly projecting nipple 36. In the cover $a$ at the axis of the chamber 35 is an air outlet port 37 that is closed against the flow of air into the milk can by a ball check valve 38. The valve 38 is within a cap-like cage 39 that is screwed into the cover and is provided adjacent its top with one or more air outlet ports 40. Nipple 36, in practice, will be connected to a source of partial vacuum such as a vacuum tank or a vacuum pump by a pipe or flexible tube 41, so that partial vacuum will be maintained in the milk can and in the chamber 35.

Mounted to reciprocate and to oscillate within the pulsator cylinder 29 is a valve-acting piston body 42, see Figs. 3, 4, 10 and 11, that is provided at its ends with piston heads 43 that reciprocate with the piston body but are not caused to oscillate therewith. The connections between the piston heads and the piston body are afforded by headed tubular trunnions 44 screwed into the piston body with their heads outward of the piston heads. The purpose of making the trunnions 44 tubular will presently appear. The cylinder 29 is provided with removable cap-like heads 29ª that are readily removable but are secured with air-tight joints preferably by threaded engagement and interposed gaskets. The piston heads 43 preferably have the customary pliable flanged discs 43ª that engage the cylinder under greater friction than does the metallic piston body 42 and piston body 42 has an upstanding shipper pin or projection 45 that works through a relatively wide elongated slot 46 formed in the top of the central portion of the pulsator cylinder. The pulsator cylinder, see particularly Figs. 10, 12 and the diagram Figs. 18, 19 and 20, has an atmosphere port 47 and other ports 48, 49, 50, 51, 52 and 53.

For co-operation with the ports above noted, piston body 42, see particularly Fig. 13, has ports 54, 55, 56, 57 and 58. Ports 54 and 55 are inter-connected by a conduit 59 and ports 56 and 57 are connected by a conduit 60. Conduit 59 is connected by an axial conduit 61 to the passage through the one trunnion 44 and conduit 60 is connected by a conduit 62 to the axial passage through the other trunnion 44. The relative arrangement and the co-operative action between the above noted ports in the cylinder and in the piston body will appear in the description of the operation.

Port 49 opens into chamber 35, port 48 is in communication with two nipples 63 and which nipples are connected one to each of the air tubes $p$, ports 50 and 52 open to the atmosphere; and ports 51 and 53 are connected by an air duct 64, the passage of which is arranged to be restricted more or less by a needle valve 65, that controls a port 65ª, see Figs. 3, 18, 19 and 20, leading directly into vacuum chamber 35.

Attention is now called to the fact that when pulsator piston 42 is reciprocated, its cam pin 45 is arranged to travel around a fixed cam block 66 formed on the bottom of a bar 67 seated on the shoulders of a pair of upstanding studs 68 rigidly secured on the top of the cylinder 29, so as to give the piston oscillatory movements at its extreme positions, thereby causing the piston body to act as a controlling valve. To produce or insure the shifting movements of pin 45 at the extreme positions of the piston, yielding cam-acting abutments in the form of curved dogs or fingers 69 are pivotally mounted on the studs 68 below the bar 67. Cam pin 45 is thrust against the curved surfaces of the cam dogs 69 at the extremes of the piston movement and thereby shifted from one side to the other of the cam block 66. The outer ends of the cam dogs 69 are upturned and are engaged by the lower ends of the coiled torsion springs 70 that are placed on the upper portions of the studs 68 with their upper ends engaged with outstanding flanges 71 of sleeves 72 that are rigidly secured for rotative adjustment on the studs 68, by means of nuts 73 applied to the threaded upper ends of said studs.

By means of the nuts 73 sleeves 72 are tightly clamped against the bar 67 and the latter is tightly clamped against the shoulders of the studs 68 without pinching the cam-acting dogs 69. Hence it is evident that rotative adjustment of the sleeves 72 will vary the tension of springs 70 on the cam dogs 69. To facilitate adjustments of flange sleeves 72, when nuts 73 are loose, they are provided with outstanding fingers 71'. The numeral 74 indicates a small stamped metal cover removably applied over and protecting the cam dogs 69 and as shown, held in place by a cap nut 75 on stud 76 projected upward from the central portion of bar 67. 77 is a carrying handle on cover a.

Operation

The operation of the mechanism above described, summarized, is as follows: When the apparatus is in operation, there will be a constant suction or partial vacuum produced in the milk pail, and hence in the inner chambers of the several teat cups so that there is a constant tendency to draw milk from the teats to the pail. Proper milking action, of course, requires a pulsating action in the pressure on the teats and this pulsating action is produced by and under the control of the reciprocatory and oscillatory piston body 42. Such pulsations are produced by alternately connecting the outer chambers of the teat cups to partial vacuum or suction and to atmospheric pressure, which causes alternate contraction and expansion of the flexible inner tubes c of said teat cups.

When the piston has reached approximately its extreme position toward the right, as shown in Fig. 18, but just before the piston has been oscillated, the relation of ports of the piston and cylinder will be as shown in Fig. 18, to wit: right-hand end of piston will be subject to suction or partial vacuum through port 65ª, right-hand portion of air duct 64, registering ports 51 and 54 and right-hand tubular trunnion 44. At the same time left-hand end of piston is connected to the atmosphere through registering ports 52, 57 and air passage through left-hand trunnion 44. Just as piston reaches the right-hand position described and shown in Fig. 18, its cam pin 45 is engaged with one of the cam dogs 69 and by the latter is shifted from the position shown by dotted line in Fig. 18 and into the position shown by full line in Fig. 15 and this reverses the relation of the valve and cylinder ports so that the left-hand end of piston will be subject to suction or partial vacuum and the right-hand end of piston will be subject to atmospheric pressure and hence the piston will be moved from its right-hand position into its left-hand position shown in Fig. 19. Fig. 19 illustrates the position of the ports when the piston has approximately reached its extreme left-hand position, but just before it has been given its oscillatory movement by engagement of its cam pin 45 with the left-hand cam dog 69. The pulsating action in the teat cups is produced by the oscillatory movements of the piston and here it will be noted that the piston port 58 is of such circumferential extent that it will, in one position, connect port 48 to atmospheric port 47 and in the other position will connect said port 48 to vacuum port 49.

Preferably also the port 58 is of such axial extent that it will always be open more or less to port 48. Hence it follows that under one direction of movement, to wit: as illustrated, movement of piston from right toward the left port 48 will be connected to atmospheric port 47 so that air will be admitted through said ports and the connections described to the outer chambers of the teat cups, thereby causing contraction of the flexible inner tubes c; and when piston moves from left toward the right, port 48 will be connected to vacuum port 49 and the outer chambers of the teat cups will be subjected to suction or partial vacuum which will cause the flexible inner tubes c of the teat cups to expand. This, of course, produces the pulsating action on the teat cups required for efficient milking action.

It has already been pointed out that the piston body 42 which acts as a valve is free to oscillate without causing the piston heads proper 43 to oscillate and this, as is obvious, reduces the power required to operate the pulsator and minimizes wear on the piston heads.

The milk drawn from the teat cups will, of course, flow through the milk tubes m and from thence through the traps formed in the valves 23, as already described. It is important to note that the flow from the two groups of teat cups assumed to be applied on different cows, will be independent one from the other. When the flow of milk is heavy through the traps, the suction or partial vacuum produced in the teat cups will be lower than when the flow of milk is not sufficient to keep the trap filled and hence the amount of vacuum or suction applied to the teats through the milk tubes in the milking action is substantially reversely proportioned to the flow of the milk. This protects the cows from excessive vacuum and causes them to be at ease so that they will give down their milk freely. As already indicated, the condition of the milk flow from the teat cups through the traps may be readily observed at all times by the operator through the transparent caps 27.

In this connection it is important to note that the trap in the valve 23 is a sort of reversed trap which causes the milk to flow first upward and then downward and to pass close to or against the transparent caps 27 and under the full flow of milk, to fill the cavity immediately below said caps. The fact should be noted that the passage 25ª is of less diameter and hence of less conducting capacity than passage 24ª and produces a restriction which causes the milk under full flow to completely fill the cavity above said passages and below said caps 27.

What I claim is:

1. A piston adapted for use in a cylinder wherein it is arranged to be given both reciprocatory and oscillatory movements, said piston having swivelled heads that will partake of reciprocatory but not of oscillatory movements of said piston.

2. A rotary valve adapted to be mounted in a valve seat and through which milk is to be drawn, said valve being formed with an inverted trap and provided over said trap with a transparent cover, making visible the flow of milk through said trap.

In testimony whereof I affix my signature.

LAURITS DINESEN.